Patented Nov. 18, 1952

2,618,567

UNITED STATES PATENT OFFICE 2,618,567

MOLDED ALUMINA

George E. Comstock, 3rd, Holden, Mass., assignor to Norton Company, Worcester, Mass., a corporation of Massachusetts No Drawing. Application October 19, 1950, Serial No. 191,075

2 Claims. (Cl. 106—62)

The invention relates to molded alumina.

One object of the invention is to provide a composition for the molding of articles of alumina which articles will have high compressive strength. Another object of the invention is to provide such composition for the manufacture of articles of great density, that is approaching the theoretical density of alumina and having very low porosity. Another object is to provide a composition whereby pieces of fine crystalline structure can be made.

Another object of the invention is to provide a composition which is specially adapted for the manufacture of articles especially of alumina by hot pressure molding technique. Another object is to enable the duplication of results in commercial manufacture of refractory wear resistant pieces. Another object of the invention is to provide material for the manufacture of articles not only resistant to abrasion but which themselves will not abrade other articles.

Other objects will be in part obvious or in part pointed out hereinafter.

For the manufacture of articles especially of alumina in order to obtain articles relatively low in porosity I use the hot molding technique. An electric furnace such as disclosed in U. S. Letters Patent No. 2,125,588 can be used. This is an efficient resistance furnace having pressure plungers. Molding is done in the graphite tube of this furnace and the mold parts themselves are preferably made of graphite. In order to reduce cost and increase production I may use multiple molds such as disclosed in U. S. Letters Patent No. 2,150,884 which shows multiple bore molds specifically for the furnace of Patent No. 2,125,588. The technique of hot pressure molding is described in these patents so therefore I need not further elaborate thereon herein except to give specific figures for temperature and pressure. Generally considerations to be taken into account in the manufacture of molded pieces out of alumina are set forth in U. S. Letters Patent No. 2,091,569. As explained therein, the best material for the molds now known is graphite.

So far as the furnace is concerned, however, I might use an induction furnace with pressure plungers and if the induction furnace has the capacity to give the desired temperature and the pressure apparatus will give the desired pressure, the same results can be achieved. The choice of one or the other type of furnace is largely an economic one or a question of the availability of the particular furnaces.

I select alumina of fine particle size for the manufacture of pieces according to this invention. I prefer fine grain made from high purity alumina which has been fused and which has a low soda content. For many years crystalline alumina has been manufactured by charging electric arc furnaces with chemically precipitated alumina of high purity. This material has some porosity but when reduced to the fine sizes that I prefer the porosity has practically disappeared. I prefer to use such alumina of low soda content. The chemically precipitated material above referred to has a small amount of soda but by analyzing samples, lots thereof having a minimum of soda can be selected. I may use this material having a minimum of soda, less than 0.2%.

On the other hand I may also use calcined material of fine crystalline structure without recrystallization. This is the type of material which used to be called amorphous but which is now referred to as micro crystalline. For example, if aluminum hydroxide $(Al(OH)_3)$ is heated to about 1000° C., water is driven off and the resultant material is of micro crystalline structure. The molding of alumina of this nature is fully described in a copending application of my colleague Archibald H. Ballard, Serial No. 723,198 filed February 12, 1947, now Patent No. 2,538,959, January 23, 1951.

In either event I prefer to use fine material. I have used electric furnace fused alumina of low soda content designated as 900 grit size in which the particles are nominally of a size of 2 microns and smaller. This means that the great majority, for example about 98%, of the particles will be not substantially larger than 2 microns in size, for example no larger than 2.5 microns, and a very considerable percentage at least over 50% will be smaller than 1 micron in size with some very fine particles down to one hundredth of a micron in size. This material is commonly selected from crushed fused alumina by hydraulic methods of classification.

I have used an alumina powder designated as a polishing powder of particle size 0.3 microns and less. This material was of the calcined variety, that is of micro crystalline structure as above explained.

As addition agents to attain the objects hereinbefore given, I provide magnesia MgO and cobalt oxide CoO. I add magnesia in the amount of 0.2% to 1.0% and I prefer about 0.4%. I add cobalt oxide in the amount of 0.7% to 1.0% and prefer about 0.9%. The magnesia is added in the form magnesium carbonate $MgCO_3$. The material used was a relatively pure magnesium carbonate of fine crystalline structure. Enough is added to give magnesia within the limits specified and of course in the molding process $CO_2$ is driven off. The cobalt oxide used was a fine powder and it is not material what crystalline structure this cobalt oxide might have so long as the particle size is of the order of particles of 5 microns and less.

The function of the magnesia in the composition is to inhibit crystal growth. However experiments using magnesia in excess of 1% promoted the formation of spinel and reduced the strength of the pieces. By maintaining a relatively fine crystalline structure and not allowing the formation of larger crystals, the strength of the molded pieces is materially increased. The function of the cobalt oxide is also to make the pieces stronger and denser and cobalt oxide appears to achieve this result by forming stringers of material between the particles of alumina thus acting as a sort of cement for the alumina. The foregoing statements, however, are to be considered as theory being the best explanation I can make but I find that the combination of small quantities of magnesia and cobalt oxide greatly increases the strength and reduces the porosity of molded alumina.

As a specific example of putting the invention into practice, graphite molds of the nature indicated and which may be as disclosed in the aforesaid patents are loaded with the mixture of powders of the aforesaid materials in the proportions named. The alumina itself has a purity of better than 99% $Al_2O_3$ and the material actually used analyzes as follows:

Table I

| | Per cent |
|---|---|
| $SiO_2$ | .06 |
| $Fe_2O_3$ | .07 |
| $Na_2O$ | .01 |
| Other materials except alumina | Trace |
| $Al_2O_3$ | Balance |

In this particular example the alumina was the hydraulically classified electrically fused low soda alumina of particle size as first described and to it was added magnesium carbonate calculated to yield 0.4% MgO and 0.9% of cobalt oxide, the above described alumina being the balance to make 100%.

Twenty grams of the above described material were mixed in a mortar with 10 cubic centimeters of distilled water containing a trace of ammonium hydroxide dispersed with one or two drops of ammonium citrate. This watery mixture was well worked with a pestle and then the resultant mix was dried in an evaporating dish. The resultant cake powder was then coarsely screened to break it up and was then loaded into a graphite mold. Pressing was done under a pressure of 2500 pounds per square inch and the temperature was brought to 1750° C. while the pressure was applied. The full pressure and the top temperature of 1750° C. were held for ten minutes.

With regard to the pressure used I do not know that any pressure would be too high but 2500 pounds per square inch is about all the graphite molds will consistently stand. Lower pressure could be used but a pressure of at least 500 pounds per square inch should be used for good pieces. The temperature at the end of the molding operation that is the highest temperature is preferably between 1650° C. and 1800° C.

Cylinders ¼ inch in diameter and ¼ inch long were made in accordance with the above example and had a compressive strength as high as 529,000 pounds per square inch. Pieces made in identical fashion without the addition of the magnesia or the cobalt oxide had a strength of only 450,000 pounds per square inch and showed greater porosity. Pieces made in accordance with the above example of this present invention had a density as high as 4.00 grams per cubic centimeter which is usually taken as the absolute density of pure alumina. Pieces made in the same manner but without the addition of the magnesia or of the cobalt oxide had a density of 3.95 grams per cubic centimeter.

Pieces of larger size, however, will have slightly less specific gravity which is the same as density in grams per cubic centimeter. Pieces having a mass of about 40 grams have been made from my composition and had a specific gravity between 3.94 and 3.98. In this size pieces made out of the same alumina but without the cobalt and magnesia addition would have a lesser specific gravity, that is to say if they were made out of the same alumina without any addition agent at all they would have a specific gravity not higher than 3.90. The importance of a specific gravity close to that of the theoretical specific gravity of the material is reflected in the reduction of porosity. Thus the pieces having a specific gravity of 4.00 had practically no porosity. Other things being equal those pieces having the least porosity will be the strongest. Furthermore the greater the density of the pieces where a given material is involved the less are they subject to wear. Articles made in accordance with the present invention will be useful and superior if they have a specific gravity at least as great as 3.94.

It will thus be seen that there has been provided by this invention an article of manufacture and a composition of matter in which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

I claim:

1. An article of manufacture having a composition consisting of from 0.2% to 1.0% of magnesia, from 0.7% to 1.0% of cobalt oxide and at least 99% of the remainder being alumina $Al_2O_3$, the article being of fine crystalline structure developed by hot pressure molding at a temperature of at least 1650° C. and not higher than 1800° C. and a pressure of at least 500 pounds per square inch, and having a specific gravity of at least 3.94 and a strength in compression greater than 450,000 pounds per square inch.

2. Process for the manufacture of hard articles of high compressive strength having a specific gravity of at least 3.94 and a strength in compression greater than 450,000 pounds per square inch consisting essentially of selecting comminuted alumina 98% of the particles of which are under 2.5 microns in size and 50% of which are smaller than one micron in size, said alumina being better than 99% pure, adding finely divided magnesia from 0.2% to 1.0% by weight, the remainder of the material being the aforesaid alumina, thoroughly mixing and then molding under the simultaneous application of heat and pressure at a temperature between 1650° C. and 1800° C. and with a pressure of at least 500 pounds per square inch.

GEORGE E. COMSTOCK, 3D.

REFERENCES CITED

The following references are of record in the file of this patent:

UNITED STATES PATENTS

| Number | Name | Date |
|---|---|---|
| 2,308,115 | Schwartzwalder et al. | Jan. 12, 1943 |
| 2,427,454 | Heany | Sept. 16, 1947 |
| 2,482,580 | Feichter | Sept. 20, 1949 |